(12) United States Patent
Gess

(10) Patent No.: US 8,459,915 B1
(45) Date of Patent: Jun. 11, 2013

(54) END USER FILLED SELF-SEALING INFLATABLE DUNNAGE BAG

(75) Inventor: Larry C. Gess, Palmyra, WI (US)

(73) Assignee: IVEX Protective Packaging, Inc., Lachine (CA)

( * ) Notice: Subject to any disclaimer, the term of this patent is extended or adjusted under 35 U.S.C. 154(b) by 0 days.

(21) Appl. No.: 13/609,469

(22) Filed: Sep. 11, 2012

Related U.S. Application Data

(60) Provisional application No. 61/537,618, filed on Sep. 22, 2011.

(51) Int. Cl.
*B60P 7/08* (2006.01)

(52) U.S. Cl.
USPC .............................. 410/119; 410/118; 410/125

(58) Field of Classification Search
USPC ............ 410/125, 118, 128, 87, 155; 206/522, 206/593; 383/3, 109, 58; 428/35.2, 178
See application file for complete search history.

(56) References Cited

U.S. PATENT DOCUMENTS

| | | | | |
|---|---|---|---|---|
| 4,941,754 A | * | 7/1990 | Murdock | 383/3 |
| 5,009,318 A | * | 4/1991 | Lepinoy | 206/524.8 |
| 5,604,016 A | * | 2/1997 | Allegre | 428/192 |
| 5,824,392 A | * | 10/1998 | Gotoh et al. | 428/178 |
| 5,857,571 A | * | 1/1999 | Tschantz et al. | 206/522 |
| 6,095,732 A | * | 8/2000 | Howlett et al. | 410/119 |
| 6,454,500 B1 | * | 9/2002 | Shetty | 410/119 |
| 7,168,567 B2 | | 1/2007 | Peper et al. | |
| 7,361,397 B2 | | 4/2008 | Perkins et al. | |
| D599,118 S | * | 9/2009 | Perkins et al. | D5/53 |

* cited by examiner

*Primary Examiner* — Glenn Dayoan
*Assistant Examiner* — Sunsurraye Westbrook

(57) ABSTRACT

A plurality of self-sealing inflatable dunnage bags are formed on a continuous strip. The continuous strip includes a first bag layer, a second bag layer and an air channel layer. A bag perimeter sealing line is formed between the first and second bag layers to form a bag cavity. Two air flow sealing lines extend into the bag cavity. An air flow channel is formed between the second and air channel bag layers. One end of a cross air flow channel communications with the air flow channel and the other end communicates with a fill opening in the second bag layer. Air from an inflation pin flows into each cross air flow passage and through the fill opening to inflate the bag cavity. Inflation of the bag cavity causes the two air flow sealing lines to seal the cross air fill passage and prevent deflation of the bag cavity.

20 Claims, 3 Drawing Sheets

END USER FILLED SELF-SEALING INFLATABLE DUNNAGE BAG

CROSS-REFERENCES TO RELATED APPLICATIONS

This is a nonprovisional patent application taking priority from provisional application No. 61/537,618 filed on Sep. 22, 2011.

BACKGROUND OF THE INVENTION

1. Field of the Invention

The present invention relates generally to inflatable packaging and more specifically to an end user filled self-sealing inflatable dunnage bag, which does not require sealing after inflation or a complex inflation apparatus.

2. Discussion of the Prior Art

It is well known in the art of inflatable packaging to fill dunnage bags with air and then heat seal the packing bags to retain the air therein. However, the inflatable dunnage bag is typically complicated or the apparatus used to produce the inflatable dunnage bags with air is also complicated. A complicated inflatable dunnage bag will require complicated machinery to fill thereof. A complicated inflatable packaging machine will not always produce a consistent product, due to the complexity of the machine and also variations in the sheet material used to produce the inflatable packaging.

Typically, a manufacturer of inflatable packaging provides a customer with inflatable packaging machines at no cost and sells the inflatable packaging to the customer. Any problems with the inflatable packaging machines is the manufacturer's responsibility and expense. It is to the manufacturer's advantage to have the simplest and most inexpensive inflatable packaging machines to produce the inflatable packaging. Further, having inexpensive inflatable packaging machinery makes it possible to sell the inflatable packaging to smaller companies.

U.S. Pat. No. 7,168,567 to Peper et al. discloses an inflatable packaging system. U.S. Pat. No. 7,361,397 discloses a film material for air-filled packing cushions.

Accordingly, there is a clearly felt need in the art for an end user filled self-sealing inflatable dunnage bag, which does not require sealing after inflation or a complex inflation apparatus.

SUMMARY OF THE INVENTION

The present invention provides an end user filled self-sealing inflatable dunnage bag, which does not require sealing after inflation or a complex inflation apparatus. A plurality of self-sealing inflatable dunnage bags are formed on a continuous strip. The continuous strip includes a first bag layer, a second bag layer and an air channel layer. The first bag layer, the second bag layer and the air channel layer are preferably fabricated from a flexible transparent plastic sheet material. A bag perimeter sealing line is formed between the first and second bag layers to form a bag cavity. The bag perimeter sealing line preferably includes a first bag edge line, a second bag edge line, a first bag end line and a second bag end line. The first bag edge line is located adjacent the first edge of the first and second bag layers. Preferably two air flow sealing lines extend from the first bag end line into the bag cavity. A first edge of the first bag layer is preferably sealed to a first edge of the second bag layer. Each air flow sealing line is preferably terminated with a curved line. However, other suitable geometric shapes could also be used.

An air flow channel is formed between the second bag layer and the air channel layer. The air flow channel preferably includes sealing a first edge of the air channel layer to the first edge of the second bag layer; sealing a second edge of the air channel layer to a second edge of the second bag layer; and sealing a portion of the air channel layer to the second bag layer to form the air flow channel and a cross air fill passage. One end of the cross air fill passage communicates with the air flow channel and continues across a width of the bag cavity to substantially the second bag edge line. A fill slit is preferably formed through the second bag layer, such that it communicates with the other end of the cross air fill passage.

The first bag layer, the second bag layer and the air channel layer are attached to each other with heating sealing, glue, adhesive or any other suitable bonding agent or method. An inflation pin of an inflation apparatus is inserted into the air flow channel. The continuous strip is pulled through the inflation apparatus, which forces air through the cross air fill passage of each dunnage bag. Air flows through each cross air fill passage; through each fill slit; and fills each bag cavity. Inflation of the bag cavity causes the two air flow sealing lines to seal the cross air fill passage and prevent deflation of the bag cavity. The two air flow sealing lines act as a check valve to prevent air flow out of the cross air fill passage.

Accordingly, it is an object of the present invention to provide an end user filled self-sealing inflatable dunnage bag, which does not require sealing after inflation or a complex inflation apparatus.

These and additional objects, advantages, features and benefits of the present invention will become apparent from the following specification.

DETAILED DESCRIPTION OF THE PREFERRED EMBODIMENTS

Figure 1:
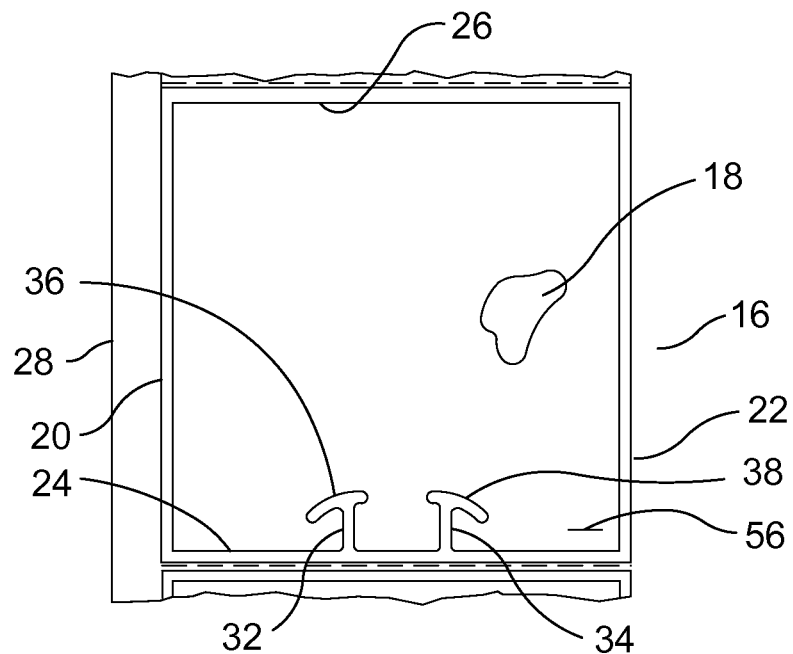
FIG. 1 is a top view of a second bag layer attached to a first bag layer of an end user filled self-sealing inflatable dunnage bag in accordance with the present invention.
Figure 2:
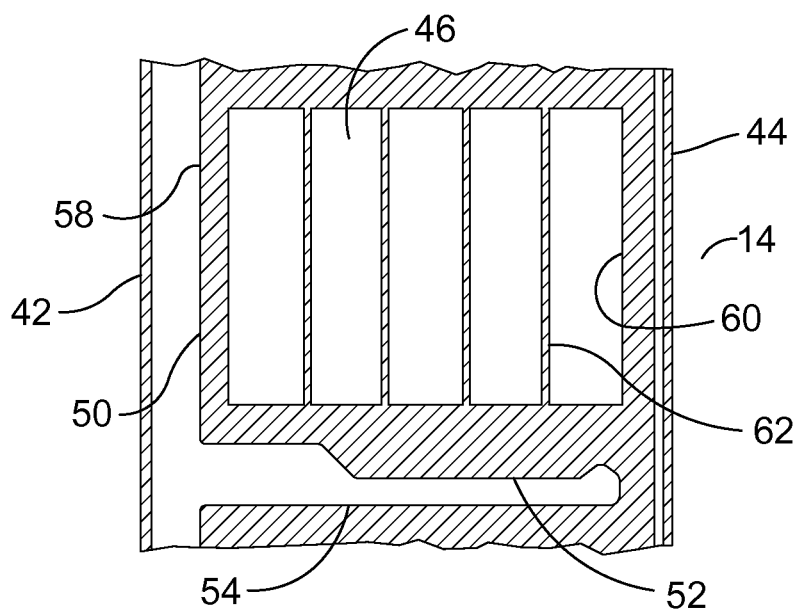
FIG. 2 is a top view of an air channel layer illustrating attachment areas between the air channel layer and a second bag layer before attachment of an end user filled self-sealing inflatable dunnage bag in accordance with the present invention.
Figure 3:
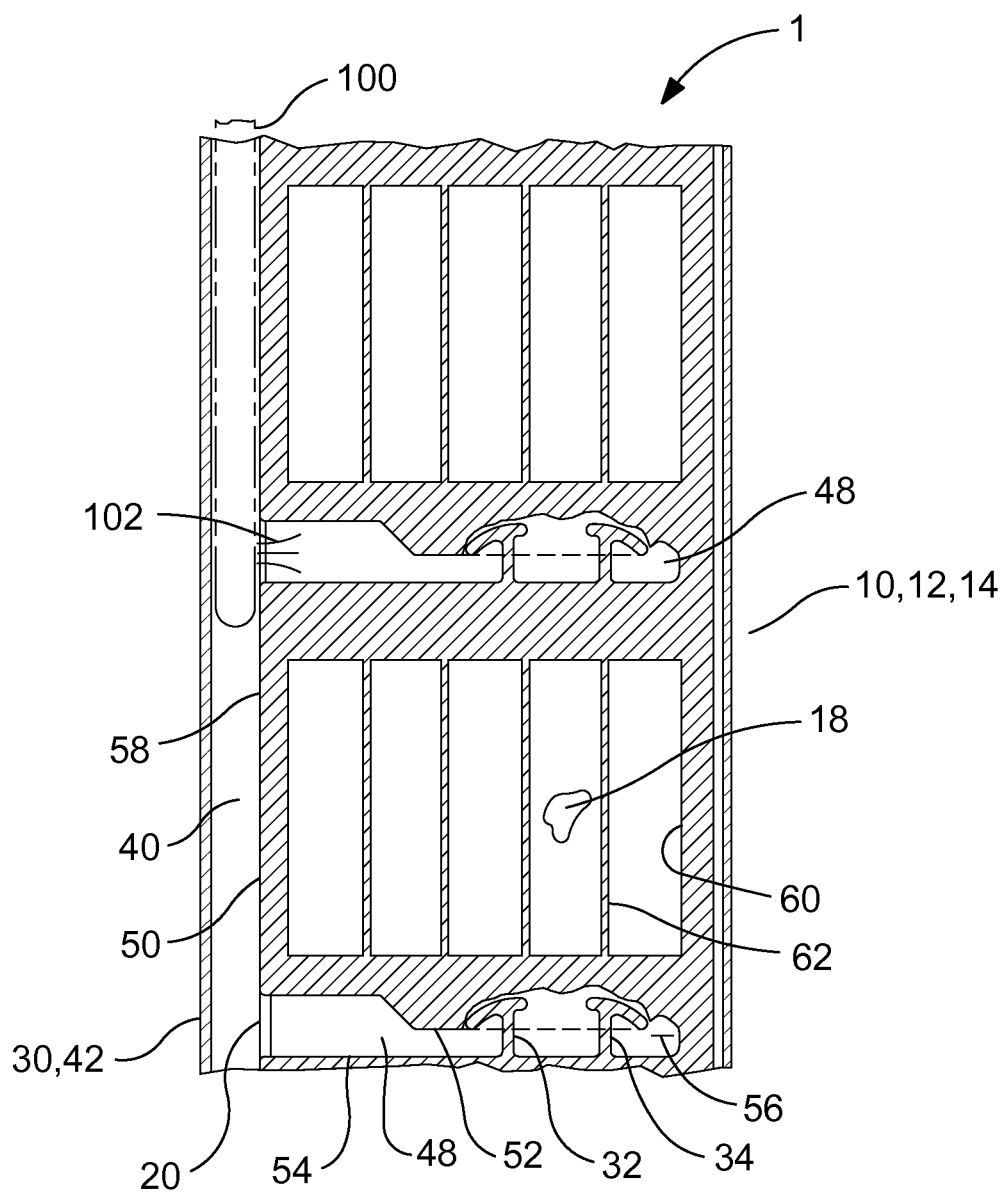
FIG. 3 is a top view of an air channel layer attached to first and second bag layers illustrating two bag cavities of an end user filled self-sealing inflatable dunnage bag in accordance with the present invention.
Figure 4:
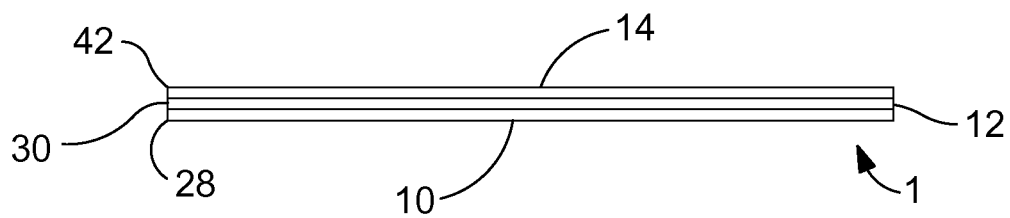
FIG. 4 is an end view of an end user filled self-sealing inflatable dunnage bag in accordance with the present invention.

With reference now to the drawings, and particularly to FIG. 3, there is shown a top view of a portion of a continuous strip of end user filled self-sealing inflatable dunnage bags 1. With reference to FIGS. 1-2 and 4-6, the continuous strip 1 includes a first bag layer 10, a second bag layer 12 and an air channel layer 14. The first bag layer 10, the second bag layer 12 and the air channel layer 14 are preferably fabricated from a transparent stretchable plastic sheet material. A bag sealing perimeter 16 is formed between the first and second bag layers to form a bag cavity 18. The bag perimeter line 16 preferably includes a first bag edge line 20, a second bag edge line 22, a first bag end line 24 and a second bag end line 26. The first bag layer 10 is preferably heat sealed to the second bag layer 12 to form the bag perimeter line 16. A first edge 28 of the first bag layer 10 is preferably heat sealed to a first edge 30 of the second bag layer. Two air flow sealing lines 32, 34 preferably extend from the first bag end line 24 into the bag cavity. The two air flow sealing lines 32, 34 are preferably terminated with two curved lines 36, 38, such that a substantial "T" shape is formed. The first and second bag layers are sealed to each other to form the two air flow sealing lines 32, 34 and the two curved lines 36, 38. However, other suitable geometric shapes could also be used.

An air flow channel 40 is formed between the second bag layer 12 and the air channel layer 14. The air flow channel 40 preferably includes sealing a first edge 42 of the air channel layer 14 to the first edge 30 of the second bag layer 12; sealing a second edge 44 of the air channel layer 14 to a second edge 45 of the second bag layer 12; and sealing a channel area 46 of the air channel layer 14 to the second bag layer 12 to form the air flow channel 40 and a cross air fill passage 48. The channel area 46 includes an air flow channel boundary 50, a first cross air fill boundary 52 and a second cross air fill boundary 54. Sealing the first edges of the second bag layer 12 and the air channel layer 14 forms one side of the air flow channel 40 and the air flow channel boundary 50 forms the other side of the air flow channel 40.

One end of the cross air fill passage 48 communicates with the air flow channel 40 and continues across a width of the bag cavity 18 to substantially the second bag edge line 22. A fill slit 56 is preferably formed through the second bag layer 12, such that it communicates with an end of the cross air fill passage 48.

However, other openings could also be used besides the fill slit 56. The cross-hatching of the channel area 46 represents the area where attachment occurs between the second bag layer 12 and the air channel layer 14. The attachment between the second bag layer 12 and the air channel layer 14 is preferably implemented with ultraviolet cured adhesive.

The channel area 46 further includes a circumferential border 58, an inner perimeter 60 and a plurality of cross lines 62. The circumferential border 58 surrounds substantially all of the surface area between the second bag layer and the air channel layer 14. The inner perimeter 60 is formed in the circumferential border 58. The plurality of cross lines 62 extend from one end of the inner perimeter 60 to an opposing end of the inner perimeter 60. The plurality of cross lines 62 decrease the amount and cost of ultraviolet adhesive used to join the second bag layer 12 to the air channel layer 14. The channel area 46 shows a preferable geometric shape, but the channel area 46 should not be limited to the illustrated geometric shape. The edges, lines and patterns of the first bag layer 10, the second bag layer 12 and the air channel layer 14 may also be attached to each other with heating sealing, glue, ultraviolet cured glue, adhesive, ultraviolet cured adhesive or any other suitable bonding agent or method.

Figure 5:
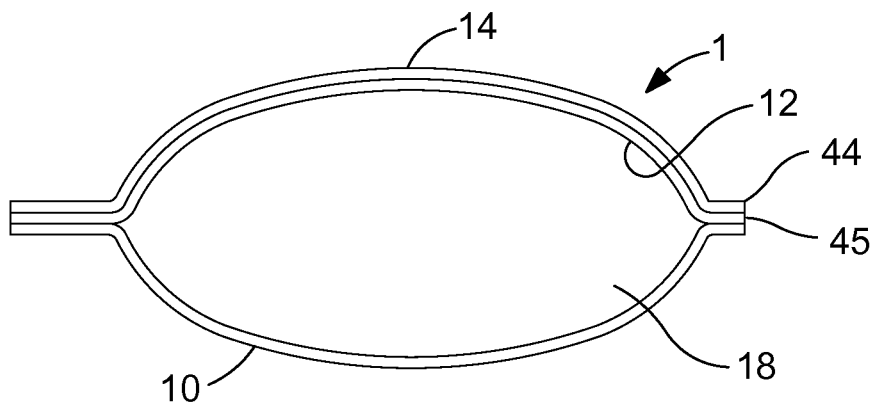
FIG. 5 is an end cross sectional view of an inflated bag cavity of an end user filled self-sealing inflatable dunnage bag in accordance with the present invention.
Figure 6:
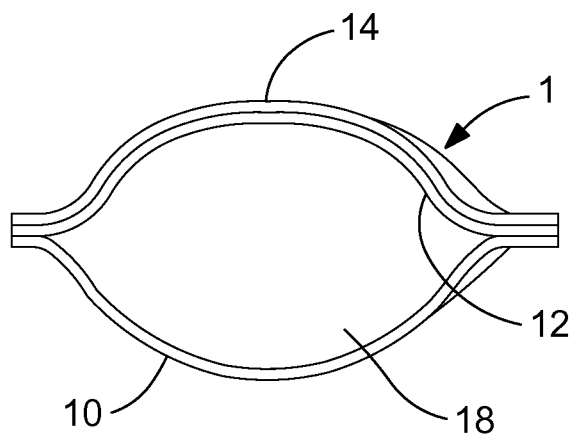
FIG. 6 is a lengthwise cross sectional view of an inflated bag cavity of an end user filled self-sealing inflatable dunnage bag in accordance with the present invention.

An inflation pin 100 of an inflation apparatus (not shown) is inserted into the air flow channel 40, which is disposed between the second bag layer 12 and the air channel layer 14. The inflation pin 100 emits air 102 into a plurality of cross air fill passage 48 of each dunnage bag in the continuous strip 1. Air 102 flows through each cross air fill passage 48; through each fill slit 56; and fills each bag cavity 18. With reference to FIGS. 5-6, inflation of the bag cavity 18 causes the second bag layer 12 to seal against the air pocket layer 14 in the area of the two air flow sealing lines 32, 34. Air is prevented from escaping the bag cavity 18 through the cross air fill passage 48, because the two air flow sealing lines 32, 34 act as a check valve to prevent air flow out of the cross air fill passage 48.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A strip of end user filled self-sealing inflatable dunnage bags, comprising:
    a first bag layer;
    a second bag layer is attached to said first bag layer to form a plurality of bag cavities between inside surfaces of said first and second bag layers, at least one air flow sealing line extending into each one of said plurality of bag cavities from a perimeter of each one of said plurality of bag cavities, said at least one air flow sealing line is created by attaching said first bag layer to said second bag layer; and
    an air channel layer is attached to an outside surface of said second layer to form an air flow channel and a plurality of cross air fill passages, one end of a one of said plurality of cross air fill passages communicates with said air flow channel and the other end of said one of said plurality of cross air fill passages communicates with a fill opening formed through said second bag layer, said one cross air fill passage is disposed over said at least one air flow sealing line,
    wherein air flows between said second bag layer and said air channel layer, the air flows through said cross air fill passage and through said fill opening to fill at least one of said plurality of bag cavities.

2. The strip of end user filled self-sealing inflatable dunnage bags of claim 1, further comprising:
    at least one of said at least one air flow sealing line is terminated with a curved line, said first bag layer is sealed to said second bag layer in the area of said curved line.

3. The strip of end user filled self-sealing inflatable dunnage bags of claim 1 wherein:
    said bag cavity includes a first bag edge line, a second bag edge line, a first bag end line and a second bag end line.

4. The strip of end user filled self-sealing inflatable dunnage bags of claim 1 wherein:
    said fill opening is a slit.

5. The strip of end user filled self-sealing inflatable dunnage bags of claim 1 wherein:
    said second bag layer is attached to said air channel layer to form a channel area, said channel area includes a circumferential border, an inner perimeter and a plurality of cross lines, said circumferential border surrounds substantially all of the surface area between said second bag layer and said air channel layer.

6. The strip of end user filled self-sealing inflatable dunnage bags of claim 5 wherein:
    said air flow channel is formed between a first edge of said air channel layer and an air flow channel boundary of said channel area.

7. The strip of end user filled self-sealing inflatable dunnage bags of claim 5 wherein:
    said cross air fill passage is formed between a first cross air fill boundary and a second cross air fill boundary of said channel area.

8. A strip of end user filled self-sealing inflatable dunnage bags, comprising:
 a first bag layer;
 a second bag layer is attached to said first bag layer to form a plurality of bag cavities between inside surfaces of said first and second bag layers, at least one air flow sealing line extending into each one of said plurality of bag cavities from a perimeter of each one of said plurality of bag cavities, said at least one air flow sealing line is created by attaching said first bag layer to said second bag layer in the area of said at least one air flow sealing line; and
 an air channel layer is attached to an outside surface of said second layer to form an air flow channel and a plurality of cross air fill passages, one end of a one of said plurality of cross air fill passages communicates with said air flow channel and the other end of said one of said plurality of cross air fill passages communicates with a fill opening formed through said second bag layer, said one cross air fill passage is disposed over said at least one air flow sealing line, wherein air flows between said second bag layer and said air channel layer, the air flows through said cross air fill passage and through said fill opening to fill at least one of said plurality of bag cavities.

9. The strip of end user filled self-sealing inflatable dunnage bags of claim 8, further comprising:
 at least one of said at least one air flow sealing line is terminated with a curved line, said first bag layer is sealed to said second bag layer in the area of said curved line.

10. The strip of end user filled self-sealing inflatable dunnage bags of claim 8 wherein:
 said bag cavity includes a first bag edge line, a second bag edge line, a first bag end line and a second bag end line.

11. The strip of end user filled self-sealing inflatable dunnage bags of claim 8 wherein:
 said fill opening is a slit.

12. The strip of end user filled self-sealing inflatable dunnage bags of claim 8 wherein:
 said second bag layer is attached to said air channel layer to form a channel area, said channel area includes a circumferential border, an inner perimeter and a plurality of cross lines, said circumferential border surrounds substantially all of the surface area between said second bag layer and said air channel layer.

13. The strip of end user filled self-sealing inflatable dunnage bags of claim 12 wherein:
 said air flow channel is formed between a first edge of said air channel layer and an air flow channel boundary of said channel area.

14. The strip of end user filled self-sealing inflatable dunnage bags of claim 12 wherein:
 said cross air fill passage is formed between a first cross air fill boundary and a second cross air fill boundary of said channel area.

15. A strip of end user filled self-sealing inflatable dunnage bags, comprising:
 a first bag layer;
 a second bag layer is attached to said first bag layer to form a plurality of bag cavities between inside surfaces of said first and second bag layers, at least two air flow sealing lines extending into each one of said plurality of bag cavities from a perimeter of each one of said plurality of bag cavities, said at least two air flow sealing lines are created by attaching said first bag layer to said second bag layer in the area of said two air flow sealing lines; and
 an air channel layer is attached to an outside surface of said second layer to form an air flow channel and a plurality of cross air fill passages, one end of a one of said plurality of cross air fill passages communicates with said air flow channel and the other end of said one of said plurality of cross air fill passages communicates with a fill opening formed through said second bag layer, said one cross air fill passage is disposed over said at least two air flow sealing lines, wherein air flows between said second bag layer and said air channel layer, the air flows through said cross air fill passage and through said fill opening to fill at least one of said plurality of bag cavities.

16. The strip of end user filled self-sealing inflatable dunnage bags of claim 15, further comprising:
 at least one of said at least two air flow sealing lines is terminated with a curved line, said first bag layer is sealed to said second bag layer in the area of said curved line.

17. The strip of end user filled self-sealing inflatable dunnage bags of claim 15 wherein:
 said bag cavity includes a first bag edge line, a second bag edge line, a first bag end line and a second bag end line.

18. The strip of end user filled self-sealing inflatable dunnage bags of claim 15 wherein:
 said second bag layer is attached to said air channel layer to form a channel area, said channel area includes a circumferential border, an inner perimeter and a plurality of cross lines, said circumferential border surrounds substantially all of the surface area between said second bag layer and said air channel layer.

19. The strip of end user filled self-sealing inflatable dunnage bags of claim 18 wherein:
 said air flow channel is formed between a first edge of said air channel layer and an air flow channel boundary of said channel area.

20. The strip of end user filled self-sealing inflatable dunnage bags of claim 18 wherein:
 said cross air fill passage is formed between a first cross air fill boundary and a second cross air fill boundary of said channel area.

\* \* \* \* \*